US006579554B2

(12) United States Patent
Moder et al.

(10) Patent No.: US 6,579,554 B2
(45) Date of Patent: Jun. 17, 2003

(54) FREEZER-TO-OVEN, LAMINATED, UNPROOFED DOUGH AND PRODUCTS RESULTING THEREFROM

(75) Inventors: Gregg Moder, Roseville, MN (US); Carina Cammarota, Minneapolis, MN (US); Melissa Hajovy, Eden Prairie, MN (US)

(73) Assignee: The Pillsbury Company, Minneapolis, MN (US)

( * ) Notice: Subject to any disclaimer, the term of this patent is extended or adjusted under 35 U.S.C. 154(b) by 210 days.

(21) Appl. No.: 09/751,510

(22) Filed: Dec. 29, 2000

(65) Prior Publication Data

US 2001/0043978 A1 Nov. 22, 2001

Related U.S. Application Data

(63) Continuation-in-part of application No. 09/549,486, filed on Apr. 14, 2000, now abandoned.

(51) Int. Cl.$^7$ ................................................. A21D 8/00
(52) U.S. Cl. ........................ 426/549; 426/502; 426/446
(58) Field of Search ...................... 426/94, 275, 446, 426/452, 502, 559, 560

(56) References Cited

U.S. PATENT DOCUMENTS

| 3,917,856 A | * | 11/1975 | Wong et al. ................... 426/94 |
| 4,374,151 A | | 2/1983 | Lindstrom et al. |
| 4,406,911 A | | 9/1983 | Larson et al. |
| 4,450,177 A | | 5/1984 | Larson et al. |
| 4,623,542 A | * | 11/1986 | Wallin et al. ................... 426/94 |
| 4,741,907 A | * | 5/1988 | Furuhashi |
| 4,743,452 A | | 5/1988 | Felske et al. |
| 4,839,178 A | | 6/1989 | Seneau |
| 4,847,104 A | | 7/1989 | Benjamin et al. |
| 4,946,699 A | | 8/1990 | Kageyama et al. |
| 4,966,778 A | | 10/1990 | Benjamin et al. |
| 5,030,466 A | | 7/1991 | Kageyama et al. |
| 5,094,859 A | | 3/1992 | Sluimer |
| 5,133,984 A | | 7/1992 | Murphy et al. |
| 5,171,590 A | | 12/1992 | Sluimer |
| 5,232,727 A | | 8/1993 | Sugie et al. |
| 5,254,351 A | | 10/1993 | de Boer et al. |
| 5,403,610 A | | 4/1995 | Murphy et al. |
| 5,405,626 A | * | 4/1995 | Van Der Graaf et al. |
| 5,447,738 A | * | 9/1995 | de Bruijne et al. ......... 426/549 |
| 5,451,417 A | | 9/1995 | Freyn et al. |
| 5,480,662 A | * | 1/1996 | Boode-Boissevain et al. |
| 5,560,946 A | * | 10/1996 | Sanders et al. ................ 426/94 |
| 5,589,207 A | | 12/1996 | Larsen, deceased et al. |
| 5,932,269 A | | 8/1999 | Huang et al. |
| 6,113,952 A | | 9/2000 | Vael |

FOREIGN PATENT DOCUMENTS

| EP | 0 561 702 A1 | | 9/1993 |
| WO | 96/34530 | | 11/1996 |
| WO | 97/25869 | | 7/1997 |
| WO | WO 97/25869 | * | 7/1997 |
| WO | WO 98/38870 | | 9/1998 |
| WO | WO 01/32023 A1 | | 5/2001 |

* cited by examiner

Primary Examiner—Carolyn Paden
(74) Attorney, Agent, or Firm—Michael C. Maier; Douglas J. Taylor; John A. O'Toole

(57) ABSTRACT

A frozen, unproofed laminated dough that can be baked without being thawed or proofed and that provides a desirable specific volume of the baked product. A frozen unproofed laminated dough includes a layer dough and shortening layers that alternate with the layer dough. The layer dough includes flour, a water-binding agent, a leavening agent, a fat source, and water. The specific volume of the frozen, unproofed laminated dough is 0.8 cc/g to ¼ cc/g. The frozen unproofed laminated dough prepared a baked product having a baked specific volume of at least 3 cc/g when baked without being thawed or proofed before baking. The frozen, unproofed laminated dough can be used to prepare Danishes, croissants, and the like.

53 Claims, No Drawings

FREEZER-TO-OVEN, LAMINATED, UNPROOFED DOUGH AND PRODUCTS RESULTING THEREFROM

This application is a continuation-in-part of U.S. patent application Ser. No. 09/549,486, filed Apr. 14, 2000, now abandoned which application is commonly owned by the assignee of the invention described and claimed herein, and the entire disclosure of the application is expressly incorporated herein by reference.

FIELD OF THE INVENTION

The invention is generally directed to a laminated dough that can be stored frozen without being proofed before being frozen and can be baked in the oven without being thawed or being proofed before being baked. More specifically, the invention is directed to a frozen laminated dough that includes flour, water, a water-binding agent, a leavening agent, and a fat source.

BACKGROUND OF THE INVENTION

Frozen ready-to-bake doughs are desirable for commercial and home baking because they minimize a cook's preparation time and are easy to use. Ready-to-bake doughs should be storage stable when frozen and should provide baked products having good organoleptic qualities and aesthetic appeal. Examples of frozen doughs are known such as, for example, U.S. Pat. No. 5,447,738; U.S. Pat. No. 5,560,946; U.S. Pat. No. 5,254,351; and PCT Application WO 96/34530.

However, problems such as dough destabilization can arise with frozen doughs, particularly doughs that have been proofed prior to freezing. Dough destabilization can result in baked products having low volume and coarse grain. Several quality parameters can affect the stability of frozen doughs. These parameters can arise from dough formulation, dough processing, and general dough handling. Examples of parameters that can affect frozen doughs include, for example, interactions between ingredients, storage temperature, freezing rates, thawing rates, and the like.

For example, some doughs include relaxing agents to facilitate processing of the dough. One type of relaxing agent is cysteine. However, cysteine can adversely affect the stability of a frozen dough by reducing the shelf life of a frozen dough or by decreasing the specific volume of a baked product prepared from a frozen dough.

Frozen doughs can also be adversely affected by exposure to temperature fluctuations. Temperature fluctuations can subject the dough to freeze-thaw cycles. Temperature fluctuations can occur during any one or more of the transportation of the dough, the distribution of the dough, and the general handling of the dough. Temperature fluctuations can adversely affect dough stability and dough integrity over normal storage periods. If dough stability is adversely affected, the shelf life can be reduced because dough structure can deteriorate, water can accumulate, and microbial growth can occur. If dough integrity is adversely affected, organoleptic qualities and appearance can be affected. For example, one frozen dough product can merge with another frozen dough product stored in close proximity, which makes it difficult to separate the dough products while maintaining the structural integrity as well as the aesthetic appeal of the dough.

Some frozen dough products have addressed problems with dough stability. However, these products are typically preproofed, which means that the dough is allowed to rise before freezing the dough. Preproofed doughs have several drawbacks. For example, preproofed doughs can be expensive because a proofing process must be performed during the manufacturing process, and they can require a significant amount of storage space. Moreover, preproofed doughs can be susceptible to temperature fluctuations and can be susceptible to mechanical stresses.

Some unproofed frozen doughs are also known, but these doughs typically include ingredients that can adversely affect dough stability.

Thus, it is desirable to develop a dough that can be stored frozen without being proofed before being frozen and that can provide a desirable baked product without being thawed or proofed before being baked.

SUMMARY OF THE INVENTION

The invention is generally directed to a laminated dough that can be stored frozen and then baked in the oven without being thawed before being baked and without being proofed before being frozen or baked.

A laminated dough of the invention is unproofed before being frozen and before being baked and can have a specific volume of about 0.8 cc/g to about 1.4 cc/g. In one embodiment, a laminated dough of the invention has a specific volume of about 1.1 cc/g to about 1.2 cc/g. A laminated dough of the invention is typically shelf stable for about 6 months at freezing temperatures.

A laminated dough of the invention includes a layer dough alternating with shortening layers. Typically, the layer dough of the invention includes flour, water, a water-binding agent, a leavening agent, and a fat source. The layer dough is then sheeted, and the shortening is added to the sheeted dough. The layer dough and shortening layer are then subjected to repeated lapping and sheeting to form a laminated dough.

The laminated dough can, in one embodiment, further include one or more of an emulsifier, a dough-developing agent, a nutritional supplement, a flavoring, a shelf-life stabilizer, an organic acid, and an oxidizer.

In one embodiment, a laminated dough of the invention includes a layer dough that has a dough consistency of about 400 B.U. to about 1200 B.U. based on a Farinograph measurement taken within 10 minutes of mixing the layer dough.

In one embodiment, a laminated dough of the invention can be substantially free of cysteine, a modified starch, or both.

Typically, a laminated dough of the invention includes a layer dough alternating with shortening layers. In one embodiment, the layer dough includes flour in an amount of about 30 weight percent to about 50 weight percent; a water-binding agent in an amount of about 0.2 weight percent to about 2 weight percent; a leavening agent in an amount of about 0.5 weight percent to about 6 weight percent; a fat source in an amount of about 2 weight percent to about 12 weight percent; and water in an amount effective to provide a flour-to-water ratio in a range of about 1.5:1 to about 2.5:1. The shortening layers include a shortening in an amount of about 15 weight percent to about 35 weight percent, calculated as a percentage of the total.

In one embodiment, the laminated dough of the invention includes a total fluidizer content of about 57 weight percent to about 70 weight percent. As used herein, the "total fluidizer content" is the total amount of moisture and fat in the laminated dough. The total fluidizer is thus described with reference to the laminated dough, i.e., including the layer dough and shortening layers. The moisture of the total fluidizer content can be provided by any ingredient that includes moisture, including water, high moisture components (e.g., liquid egg, milk and cream yeast), as well as ingredients provided in powder form (e.g., flour). The fat of the total fluidizer content can be provided by fat sources such as shortening, butter, oils, and the like. The total fluidizer content will also be described herein as including the total amount of plasticizers and lubricants in the laminated dough. As used herein, "plasticizers" include water and water-containing ingredients (e.g., those ingredients providing the moisture of the total fluidizer content). "Lubricants" include ingredients containing a fat source such as shortening, oils, animal fats, and the like (e.g., those ingredients providing the fat of the total fluidizer content). The total fluidizer content is typically either calculated or analyzed with respect to the laminated dough after formation of the laminated dough, and prior to baking.

In another embodiment, a laminated dough of the invention includes an emulsifier, a shelf-life stabilizer, or both.

A laminated dough of the invention is particularly advantageous because it prepares a desirable baked product that has a baked specific volume of at least 2.5 cc/g, preferably at least 3 cc/g. In one embodiment, a baked product of the invention has a baked specific volume of about 4 cc/g to about 6 cc/g.

One advantage of a laminated dough of the invention is that it does not need to be proofed before freezing or before baking and does not need to be thawed before baking, which is useful for saving preparation time and storage space. That is, a laminated dough of the invention does not need to be preproofed, but it can still provide a desirable baked product.

Another advantage of a laminated dough of the invention is that the dough is more resilient to temperature fluctuations so that it can maintain its stability and integrity.

DETAILED DESCRIPTION OF THE INVENTION

The invention is directed to a laminated dough suitable for preparing a baked product that has distinct layers, a flaky crumb, and a crisp crust. The laminated dough of the invention is unproofed and stored frozen. Further, the laminated dough of the invention can be baked without thawing or proofing the laminated dough before baking.

The specific volume of the laminated dough will be discussed with reference to the laminated dough, and the baked product. As used herein, discussion of the specific volume of the laminated dough will refer to the specific volume of the dough after it has been mixed and laminated. The specific volume of the laminated dough is typically measured prior to baking, and can be measured either after formation of dough pieces (e.g., croissant, Danish or the like) and prior to freezing, or after being taken from frozen storage conditions. The "baked specific volume" refers to the specific volume of the product after it has been baked, for example, a baked croissant or Danish.

A laminated dough includes any dough having alternating shortening layers and water-flour layers.

Temperatures suitable for freezing a laminated dough of the invention include, for example, less than about 15° F., preferably less than about 0° F., and more preferably less than about −10° F.

A laminated dough of the invention is shelf stable without storage in a package with a modified atmosphere such as, for example, without storage in carbon dioxide, nitrogen, or limited headspace. "Shelf stable" refers to a laminated dough that is capable of withstanding at least one freeze/thaw cycle, wherein a freeze/thaw cycle comprises a temperature fluctuation of the dough between about 32° F. and about 50° F. The shelf stable dough is suitable for storage at freezing temperatures without the dough breaking down by, for example, microbial growth, water accumulation, failure of the leavening agent, and the like, and becoming unsuitable for consumption.

The laminated dough of the invention does not require proofing before being frozen or baked to produce a desirable baked product. Proofing describes the process of letting a dough product increase in size to at least about two times the original dough size by reaction of yeast before baking. In commercial processes, proofing typically occurs after the dough is formed, for example, into dough pieces, and just prior to baking. Before baking, a laminated dough of the invention typically has a specific volume of about 0.8 cc/g to about 1.4 cc/g, preferably about 1.1 cc/g to about 1.2 cc/g. After baking, the baked product typically has a specific volume of about 3 to about 6 times that of the frozen laminated dough.

The laminated dough of the invention can be removed from the freezer and placed directly in an oven without thawing, and the dough proofs in the oven during baking. The invention thus eliminates a separate proofing step. The oven can be cold or preheated. The baking temperature and time can depend on, for example, the size and shape of the laminated dough as well as whether the oven is cold or preheated. The temperature of the oven can be in a range of, for example, about 350° F. to about 400° F., preferably about 370° F. to about 385° F. The dough can be baked at this temperature for about 22 minutes to about 32 minutes, preferably about 24 minutes to about 30 minutes, and more preferably about 25 minutes to about 27 minutes.

The laminated dough of the invention can also be prepared by thawing overnight at a temperature of about 40° F., followed by baking the dough. One skilled in the art would understand that the baking time and temperature can vary depending upon, for example, the temperature of the dough when it is removed from the freezer and is placed in the oven.

The laminated dough of the invention can be used to prepare a variety of baked goods. The laminated dough of the invention is typically useful for preparing yeast-risen wheat dough products. Baked products that can be prepared from a laminated dough of the invention include, for example, croissants and Danishes.

Composition

Typically, a laminated dough of the invention includes flour, water, a water-binding agent, a leavening agent, and a fat source. The laminated dough can also contain one or more of several additional ingredients, such as dough stabilizing agents. The laminated dough of the invention also includes about 8 to about 64 layers of shortening and preferably about 16 to about 48 layers of shortening. A shortening layer includes shortening as described below. A flour-water layer includes a dough prepared from flour, water, a water-binding agent, a leavening agent, and a fat source. The shortening layers alternate with flour-water layers. To distinguish the dough of the flour-water layers from the laminated dough of the invention, the dough of the flour-water layers is called "layer dough."

Flour

The laminated dough of the invention includes a grain constituent that contributes to the structure of the dough.

Wheat flour is a grain constituent that is frequently used in baked goods. Suitable flours include hard wheat winter and spring flours with protein ranges of about 10.8 weight percent to about 16 weight percent. A high protein flour (for example, a flour containing about 12 to about 16 weight percent protein) is preferred. Alternatively, flours can be supplemented with a protein supplement such as gluten, for example, when the protein content of the flour is lower than desired. As described in more detail herein, the use of a protein supplement will often be determined based upon the desired total protein content of the laminated dough. In yet another embodiment, soft wheat flour or lower protein flours can also be used.

A laminated dough of the invention does not require an artificial flour that has modified starch (e.g., cross-linked starches derived from maize or tapioca).

A laminated dough of the invention typically includes an amount of flour effective to provide structure to the layer dough. That is, a laminated dough of the invention includes flour in an amount effective to provide desirable layer dough consistency. The amount of flour should not be so high that the layer dough is dry and loses its ability to expand. However, the amount of flour should not be so low that the layer dough is so soft that it merges with the shortening layers when formulated into a laminated dough of the invention. A laminated dough of the invention can include flour in an amount of about 30 weight percent to about 50 weight percent, preferably about 35 weight percent to about 45 weight percent, and more preferably about 35 weight percent to about 40 weight percent, as calculated based upon the total weight of the layer dough.

As described herein, the flour includes moisture and protein. Thus, the flour contributes to the moisture content of the laminated dough, as well as the total protein content of the laminated dough. The flour amounts described above are based on flour having about 12 weight-percent to about 14 weight-percent moisture, about 12 weight-percent to about 14 weight-percent wheat protein, and about 0.4 weight-percent to about 0.6 weight-percent ash based on the amount of flour. One skilled in the art having read the specification would understand that flour amounts suitable for use with a laminated dough of the invention can vary depending upon the characteristics of flour used. For example, when a flour with a lower moisture and/or protein content is used, the percentages given above will vary.

The term "weight percent" as used herein is based on the total weight of the laminated dough, including the flour-water layers and the shortening layers, unless specifically indicated to the contrary.

Water

A laminated dough of the invention also includes water. Water can act as a plasticizer, a leavening agent, or both. The total amount of plasticizers (e.g., the amount of water from all sources) should be effective to provide a desirable layer dough consistency suitable for a laminated dough of the invention.

When water acts as a plasticizer, water gives extensibility to the layer dough, which facilitates the molecules moving and stretching. Desirable extensibility facilitates the laminated dough of the invention baking into a product having a desirable specific volume. A desirable specific volume of a baked product according to the invention is at least 3 cc/g, preferably about 4 cc/g to about 6 cc/g, and more preferably about 4.5 cc/g to about 5.5 cc/g.

Moreover, water can facilitate the leavening of a laminated dough of the invention by forming steam, which acts as a leavening agent.

The amount of water in the laminated dough will vary depending upon such factors as the amount of plasticizers (i.e., the amount of moisture provided by other sources than the water in the layer dough) and dry ingredients used in the formulation, the humidity of the processing conditions, the length of processing time, and the like. The total amount of plasticizers in the laminated dough should not be so high that the laminated dough is so soft that it loses its layers as a result of merging of the layer dough with the shortening layers. However, the total amount of plasticizers should not be so low that the layer dough is so dry that it loses its ability to expand. Typically a dough of the invention includes flour and water in a flour-to-water ratio in a range of about 1.5:1 to about 2.5:1, preferably about 1.6:1 to about 2.1:1, and more preferably about 1.7:1 to about 2:1.

Water-Binding Agent

A laminated dough of the invention preferably includes a water-binding agent. A water-binding agent suitable for use in a laminated dough of the invention contributes to the hydration of the dough. A water-binding agent can also improve the development of the dough by improving the resistance of the dough to shearing during mixing.

Although this invention is not limited to any particular theory, it is believed that a water-binding agent allows the dough to retain high amounts of water and to expand during baking. In other words, a water-binding agent releases water during the baking process, thereby allowing the dough to expand.

Water-binding agents suitable for use in a laminated dough of the invention include gelling agents and thickening agents. Gelling agents suitable for use with a laminated dough of the invention include any compound that can form a gel. The gelling agent can be proteinaceous or non-proteinaceous.

Examples of suitable gelling agents include such gel-forming proteins as gelatin, agar, hydrolyzed gelatin, gelatin precursors such as collagen, and the like.

Thickening agents suitable for use with a laminated dough of the invention include any compound that can increase the viscosity of a medium when the compound is dispersed in water. Examples of suitable thickening agents include such gums as, for example, guar gum, xanthan gum, cellulose gum, gum arabic, and the like.

Examples of suitable non-proteinaceous thickening agents include pectin, alginate, carrageenan, carboxymethyl cellulose, methyl cellulose, hydroxypropyl cellulose, hydroxypropylmethyl cellulose, and the like.

In one embodiment, the water-binding agent includes pectin. In another embodiment, the water-binding agent includes gelatin. In still another embodiment, the water-binding agent includes guar gum and at least one of pectin and gelatin.

Some gelling agents that have been particularly useful in a laminated dough of the invention are those packaged with additional enzymes such as, for example, GENU® FREEZE (Copenhagen Pectin A/S, Denmark) and GENU® FOOD GUM X6021 (Copenhagen Pectin A/S, Denmark). These gelling agents also include hemicellulases, which can also increase absorption by solubilizing insoluble pentosans. A laminated dough of the invention can also include an amylase. An amylase includes any enzyme that can hydrolyze O-glucosyl linkages in starch, glycogen, and related polysaccharides. Examples of amylase include α-amylase. Other examples of pectin-enzyme blends include, for example, an enzyme blend available from Danisco Cultor under the product number TS-B820), and an alginate-enzyme blend (also available from Danisco Cultor under product number TS-B821).

The amount of water-binding agent in a layer dough of the invention is effective to provide desirable baking development and desirable frozen stability.

As contemplated in the invention, the amount of water-binding agent should not exceed an amount that would result in a laminated dough that is so dry that it loses its ability to expand. However, the amount of water-binding agent should not be so low that a laminated dough of the invention is so soft that it loses its layers because the layer dough merges with the shortening layers or so low that the amount of water absorbed into the dough is so negligible that a desirable baked product cannot be prepared.

The amount of water-binding agent can be in a range of about 0.2 weight percent to about 2 weight percent, preferably about 0.4 weight percent to about 1.5 weight percent, more preferably about 0.5 weight percent to about 0.9 weight percent.

Leavening Agent

A laminated dough of the invention also includes a leavening agent to increase the volume and alter the texture of a baked product prepared by a laminated dough of the invention. Typically, the leavening agent saturates the dough with carbon dioxide and creates nuclei for leavening gases. Leavening agents suitable for use in a laminated dough of the invention include air, steam, yeast, chemical leaveners, and the like.

The amount of leavening agent is effective to leaven a baked product prepared from a laminated dough of the invention. A preferred leavening agent is yeast. Yeast as leavening agent provides such desirable qualities as specific volume, flavor, and texture. Compressed yeast is typically present in an amount of about 0.5 weight percent to about 6 weight percent, preferably about 0.75 weight percent to about 5 weight percent, and more preferably about 3 weight percent to about 4 weight percent based on the total weight of the laminated dough. The amount of yeast used according to the invention is sufficient to provide desirable flavor, oxidation, and texture in the baked product.

When the leavening agent used is water, these percentages vary.

The leavening agent can, in some embodiments, comprise a chemical leavening agent. Chemical leavening typically involves the interaction of a leavening acid and a leavening base, such as sodium bicarbonate. The leavening acid triggers the release of carbon dioxide from bicarbonate upon contact with moisture.

The evolution of carbon dioxide essentially follows the stoichiometry of typical acid-base reaction. The amount of leavening base present determines the amount of carbon dioxide evolved, whereas the type of leavening acid affects the speed at which the carbon dioxide is liberated. The amount of leavening base used in combination with the leavening acid should be balanced such that a minimum of unchanged reactants remain in the finished product. An excess amount of leavening base can impart a bitter flavor to the final product while excess leavening acid can make the baked product tart.

Sodium bicarbonate, or baking soda, is a leavening base that is the primary source of carbon dioxide gas in many chemical leavening systems. This compound is stable and relatively inexpensive to produce. Other leavening bases include potassium bicarbonate, ammonium carbonate, and ammonium bicarbonate.

Examples of suitable leavening acids include sodium or calcium salts of ortho, pyro, and complex phosphoric acids in which at least two active hydrogen ions are attached to the molecule. Baking acids include monocalcium phosphate monohydrate (MCP), monocalcium phosphate anhydrous (AMCP), sodium acid pyrophosphate (SAPP), sodium aluminum phosphate (SALP), dicalcium phosphate dihydrate (DPD), dicalcium phosphate (DCP), sodium aluminum sulfate (SAS), glucono-delta-lactone (GDL), potassium hydrogen tartrate (cream of tartar), and the like.

Preferably, the chemical leavening agents are encapsulated. Suitable materials that can be used to encapsulate the leavening agent include fats, maltodextrin, and proteinaceous materials. Encapsulation materials and processes are known, and are described, for example, in U.S. Pat. No. 5,855,945 (Laughlin et al., commonly owned by the assignee of the present application, and incorporated herein by reference).

Fat Source

A laminated dough of the invention also includes a fat source. As described herein, the fat source can comprise components that act as lubricants in the layer dough and contribute to the total fluidizer content of the laminated dough. According to the invention, a fat source contributes to a baked product having desirable palatability, physical texture, physical form, and overall aesthetic appeal. The fat source generally provides a baked product with a tender, soft, fluffy mouth feel; a light flaky texture; and a crisp outer crust with a glossy appearance. The fat source can also contribute to the volume and grain of a baked product.

Suitable fat sources include shortening and oils. In one embodiment, the fat source comprises a shortening. Shortening in the layer dough can be either from an animal or vegetable source. Shortening in the layer dough generally includes fats and fatty oils, which are made of predominantly triesters of glycerol with fatty acids, commonly called triglycerides. The number of triglycerides in a given natural fat is a function of the number of fatty acids present and specificity of the enzyme systems involved in that particular fat-synthesis reaction.

Fats and fatty oils useful in producing shortening consistent with the invention include cottonseed oil, ground nut oil, soybean oil, sunflower oil, rape seed oil, sesame oil, olive oil, corn oil, safflower oil, palm oil, palm kernel oil, coconut oil, and combinations thereof. In addition to being useful in producing shortening, these and other similar oils can be used as the fat source.

Another example of a suitable fat source in the layer dough is butter.

The layer dough in the laminated dough of the invention can include any number of compositions that include fat and have a variety of physical states and/or physical forms. Suitable physical states of the fat source include liquid, semisolid, and solid. Suitable physical forms of shortening include plasticized shortening, chip shortening, and extruded shortening. Preferably the fat in the layer dough includes butter, hydrogenated vegetable oil, or a combination thereof.

The amount of fat source in a laminated dough of the invention is effective to provide a baked product having a tender, soft, fluffy mouth feel; a light, flaky texture; and a crisp outer crust. The amount of fat source in the laminated dough is also provided in an amount effective to increase the expansion of the dough during baking. The amount of fat source should not exceed an amount that would provide a baked product having a gummy texture. However, the amount of the fat source included in the composition should not be so low that a laminated dough of the invention provides a baked product having a tough, dry, crumbly texture and a less than desirable specific volume.

Incorporation of a large amount of a fat source in the layer dough, in addition to shortening included in the shortening layers of the laminated product, provides a combination of desirable qualities to the baked product. As described herein, the fat source in the layer dough can be effective as a lubricant. As a lubricant, the fat source can provide extensibility to the layer dough. The extensibility contributes to the desirable specific volume of a baked product prepared from a laminated dough of the invention. As a lubricant, the fat source can reduce hydrophobic interactions in the three-dimensional gluten film by competitive interaction. This allows more extensibility in the dough. Incorporation of a large amount of a fat source in the layer dough itself thus contributes to an improved specific volume and texture of the baked product.

The amount of fat source (e.g., shortening) present in the layer dough is typically in a range of about 2 weight percent to about 10 weight percent, preferably about 3 weight percent to about 7 weight percent, and more preferably about 3 weight percent to about 6 weight percent based on the total weight of the laminated dough.

Total Fluidizer Content of the Laminated Dough

In another aspect, a preferred laminated dough of the invention can be characterized as including a total fluidizer content that is greater than conventional laminated doughs. As described herein, the total fluidizer content includes the total amount of moisture and fat in the laminated dough. Moisture and fat can also enter the formula by addition of "rework" or recycled cutting of imperfect product. Typically, the total fluidizer content of the laminated dough of the invention is about 57 weight percent to about 70 weight percent, based on the total weight of the laminated dough.

For example, the total fluidizer content of croissants and puff pastry prepared by conventional methods has been compared to freezer-to-oven croissants and Danish prepared according to the invention. Generally, puff pastry is an unleavened laminated dough, i.e., the puff pastry dough does not include either chemical leavening agents or yeast. Typically, puff pastry includes no additional leavening agent beyond steam generated at baking temperatures, versus the yeast leavening agent used in the invention. Puff pastry is freezer-to-oven dough but is not used to make products like croissants, as the puff pastry has a different texture, flavor and specific volume. Examples of puff pastry commercially available include Strudel Sticks™ and Strudel Bites™, commercially available from The Pillsbury Company, Minneapolis, Minn. The comparison is summarized in Table 1 below. Croissants and Danishes prepared according to the invention are indicated as freezer-to-oven, or "FTO," croissants and Danishes. The averages are expressed in weight percent, based upon the total weight of the frozen, laminated dough.

TABLE 1

Comparison of conventional croissants and puff pastry versus FTO croissants and Danish.

| | Conventional Croissants | Conventional Puff Pastry | Conventional Danish | FTO Danish | FTO Croissant |
|---|---|---|---|---|---|
| Moisture & Fat Contribution from Flour (13% moisture basis), Shortening, Butter, Water, Yeast, & Eggs | 48.4–55.4 | 52.1–59.3 | 52.1–56.1 | 43.7–66.7 | 53.4–68.5 |
| Net Increase in Fat & Moisture as a Result of Rework | 0–2.4 | 0.8–1.8 | 1–1.3 | 0–11.8 | 0 |
| Total Moisture Plus Fat (Total Fluidizer Content) | 52.0–52.9 | 56.8–57.2 | 53.9–56.8 | 57.2–61.5 | 59.8–61.8 |
| Average Moisture & Fat in Laminated Dough | 52.4 | 57.0 | 55.0 | 58.7 | 60.8 |

Shortening Layers

The laminated dough of the invention comprises layer dough alternating with shortening layers. Shortening in the shortening layers of a laminated dough of the invention includes any solid shortening. As used herein, "solid shortening" used in the shortening layers can be a solid fat (e.g., hydrogenated vegetable oil), a solid fat combined with water (e.g., margarine), butter, animal fat (e.g., beef tallow or lard), or combinations thereof. Preferably the shortening in the shortening layers includes butter.

The shortening in the shortening layers typically is in a range of about 15 weight percent to about 35 weight percent, preferably about 20 weight percent to about 31 weight percent, and more preferably about 20 weight percent to about 29 weight percent based on the total weight of the laminated dough. These amounts do not take into consideration the amount of shortening, if present, in the layer dough.

As discussed herein, the shortening of the shortening layers also contributes to the total amount of fat in the laminated dough, and thus contributes to the total fluidizer content of the laminated dough.

Protein Content of the Composition

As used herein, the "total protein content" of a laminated dough is the total amount of protein in the laminated dough, calculated as a weight percentage of the laminated dough. The total protein content includes protein from all sources, including flour and gluten (e.g., wheat protein), as well as yeast, milk, eggs, and the like.

According to the invention, the laminated dough includes a total protein content of about 5 weight percent to about 8 weight percent, preferably about 6 weight percent to about 7 weight percent. For example, in one embodiment, when the laminated dough is used to prepare a croissant according to the invention, the total protein content of the laminated dough, i.e., including protein from flour, gluten, yeast, milk and eggs, can be about 6 weight percent to about 7 weight percent. In another example, when the laminated dough is used to prepare a Danish according to the invention, the total protein content of the laminated dough can be about 6.5 weight percent to about 7 weight percent.

The total protein content of the laminated dough preferably provides structure to the layer dough, and can contribute to a baked product prepared from a laminated dough of the invention having a crisp, brown outer crust as well as a tender interior that is moist but not doughy.

In one embodiment, the total protein content of the laminated dough is achieved by including a high protein flour as the flour component in the layer dough. For example, a flour can be used in the laminated dough that provides the desired total protein content for the laminated dough.

Alternatively, when the flour component does not include enough protein to achieve the desired total protein content for the laminated dough, a protein supplement can be included. However, it will be readily apparent that the protein supplement is not required in the composition of the invention. As used herein, a "protein supplement" means a source of protein in addition to the protein provided by the main flour component of the dough.

A suitable protein supplement can include proteins resulting from amino acids such as, for example, glycine, alanine, leucine, isoleucine, valine, phentolamine, turicine, tryptophan, proline, methionine, cystine, serine, threonine, asparagine, glutamine, histidine, aspartic acid, glutamic acid, lysine, and arginine. Other suitable protein supplements include, for example, α-keratin, collagen, fibroin, sclerolin, myosin, actin, carboxypeptidase, trypsin, ovalbumin, casein, and the like.

Other suitable protein supplements include dairy protein, egg protein, wheat protein, or a combination thereof. Examples of suitable dairy proteins include whey, soy protein, caseinate, buttermilk, buttermilk solids, and nonfat dry milk. Examples of suitable egg proteins include albumin. Examples of suitable wheat proteins include gluten or those derived from flour.

A laminated dough of the invention can include a protein supplement in a range of about 0.4 weight percent to about 2.5 weight percent, preferably about 0.6 weight percent to about 2.3 weight percent, and more preferably about 0.8 weight percent to about 1.5 weight percent based on the total weight of the laminated dough. One of skill in the art will appreciate that the amount of protein supplement included will vary depending upon the amount of protein included in the flour, and the desired total protein content of the laminated dough.

The total protein content should not exceed an amount that would provide a tough, crumbly baked product. However, the total protein content should not be so low that a laminated dough provides a baked product having a gummy, doughy texture.

Additional Ingredients

The laminated dough of the invention also typically includes sugar and salt. Salt can enhance the flavor of a baked product prepared from a laminated dough of the invention, impart toughness to the gluten, and provide strength to the crumb. Salt can be present in an amount effective to provide a desirable flavor. Salt is typically present in a range of about 0.3 weight percent to about 1 weight percent.

Sugar can also enhance the flavor of a baked product prepared from a laminated dough of the invention. Sugar acts as a substrate for yeast and as a starting material for the Maillard reaction, which facilitates color formation of the crust. Sugar is typically present in a range of about 1 weight percent to about 8 weight percent. The amount of sugar used in the product will vary depending upon such factors as the overall sweetness of the product to be formed by the laminated dough. For example, sweet products such as Danish typically include a higher amount of sugar than other products that are not formulated to be as sweet. It has been found that a sugar concentration of greater than about 4 weight percent can, in some embodiments, have an adverse effect (or a "deadening effect") on the specific volume of the final baked product. Suitable sugar includes granulated sugar, honey, high fructose corn syrup, and the like.

The dough of the invention can also include additives, for example, emulsifiers, dough-developing agents, nutritional supplements, flavorings, shelf-life stabilizers, organic acids, dough stabilizing agents (e.g., oxidizers), and the like. Additives can modify texture or any number of characteristics of a laminated dough of the invention or a baked product resulting therefrom.

An emulsifier can influence the texture and homogeneity of the dough mixture, increase dough stability, and improve the eating quality of a baked product. An emulsifier includes nonionic surfactants, anionic surfactants, and cationic surfactants. Suitable emulsifiers include, for example, lecithin, mono- and diglycerides of fatty acids, propylene glycol monoesters and diesters of fatty acids, glyceryl-lacto esters of fatty acids, ethoxylated monoglycerides and diglycerides, sodium stearoyl lactylate, diacetyl tartaric acid esters of monoglycerides, and the like.

In one embodiment, a laminated dough of the invention includes an emulsifier including sodium stearoyl lactylate, diacetyl tartaric acid ester of monoglycerides and diglycerides (DATEM), or a combination thereof.

A dough-developing agent can enhance the elasticity or extensibility of a dough. Any number of dough-developing agents can be used including, for example, azodicarbonamide, ascorbic acid, sodium bisulfite, potassium bromate, benzoyl peroxide, and organic acids such as potassium sorbate or salts of organic acids. In addition, enzymes such as transglutaminase or lipoxygenase can be used. One example of such an enzyme is a transglutaminase, amylase and hemicellulase enzyme product available from R öhm Enzyme gmbh, under product name "Veron CLX."

In one embodiment, a laminated dough of the invention includes a dough-developing agent including azodicarbonamide, ascorbic acid, or a combination thereof.

A nutritional supplement can be added to a laminated dough of the invention. Examples of suitable nutritional supplements include vitamins, minerals, proteins, and the like can be added to a laminated dough of the invention. Examples of nutritional supplements include thiamin, riboflavin, niacin, iron, calcium, and the like.

Flavorings such as, for example, sweeteners, spices, and specific flavorings can be added to a laminated dough of the invention. Sweeteners include, for example, honey, regular and high fructose corn syrup, sucrose (cane or beet sugar), dextrose, and the like.

Shelf-life stabilizers such as, for example, preservatives and mold inhibitors can be added to a laminated dough of the invention. Suitable shelf-life stabilizers include, for example, sodium salts of propionic or sorbic acids, as well as emulsifiers such as sodium stearoyl lactylate, and the like.

Dough stabilizing agents such as oxidizers can be added to the laminated dough of the invention to provide shelf life stability. Examples of suitable oxidizers include ascorbic acid, azodicarbonamide, bromate, and the like.

Table 2 illustrates the useful, preferred, and more preferred ranges of the flour, water-binding agent, leavening agent, and fat source included in a laminated dough of the invention.

TABLE 2

Ingredients In A Laminated Dough Of The Invention

| INGREDIENTS | WEIGHT PERCENT | | |
|---|---|---|---|
| | USEFUL | PREFERRED | MORE PREFERRED |
| Flour | 30–50 | 33–45 | 35–40 |
| Water-Binding Agent | 0.2–2 | 0.4–1.5 | 0.5–0.9 |
| Leavening Agent | 0.5–6 | 0.75–5 | 2–4 |
| Fat Source (e.g., shortening) | | | |
| Layer Dough | 2–10 | 3–7 | 3–6 |
| Shortening Layers | 15–35 | 20–31 | 20–29 |

A laminated dough of the invention can be free of relaxing agents that facilitate a dough's resistance to mechanical stresses such as mixing, sheeting, and the like. Relaxing agents can adversely affect the shelf life of frozen doughs as well as specific volume. In one embodiment, the laminated dough includes an amount of dry yeast as a substitute for a relaxing agent.

The term "free of" as used herein includes an amount of less than 15 ppm, preferably no more than 10 ppm, and more preferably no more than 5 ppm based on flour.

Relaxing agents can include reducing agents such as, for example, cysteine, bisulfite, sorbate, and the like. In one embodiment, a laminated dough of the invention is free of cysteine.

A laminated dough of the invention can also be free of a modified starch (e.g., cross-linked starches derived from maize or tapioca).

A laminated dough of the invention is particularly desirable because it can prepare a baked product that has a specific volume of at least 3 cc/g, preferably about 4 cc/g to about 6 cc/g, and more preferably about 4.5 cc/g to about 5.5 cc/g. This is surprising because the laminated dough of the invention is not preproofed. By comparison, conventional frozen croissant dough, designed to be thawed and proofed, would provide a baked product having a specific volume of 1.8 to 2.8 when baked as freezer-to-oven (i.e., according to the process described herein, and without a proofing step). In another embodiment, when the laminated dough of the invention is used to prepare a Danish, the dough of the invention can prepare a baked product that has a specific volume of at least 2.5 cc/g. This is surprising, since the laminated dough of the invention is not preproofed, and the additional ingredients of the Danish typically reduce the specific volume of the final baked product.

One advantage of a laminated dough of the invention is that it does not need to be proofed or thawed prior to baking, which is useful for saving time and storage space. Another advantage of a laminated dough of the invention is that the dough is more resilient to temperature fluctuations so that it can maintain its stability and integrity.

Another advantage of a laminated dough of the invention is that, in order to sustain the product shelf life, the laminated dough does not need to be packaged under a modified atmosphere.

Processing

A laminated dough of the invention can generally be prepared by mixing the above-described ingredients to form a layer dough to provide the flour-water layers, rolling in the shortening layers, shaping the laminated dough, and freezing the laminated dough. One skilled in the art having read the specification would understand that the mixing and rolling steps are generally performed using accepted technique for the product to be made, for example, puffed-pastry, croissant, Danish, or the like.

Mixing a Layer Dough to Provide the Flour-Water Layers

A layer dough suitable for providing the flour-water layers in a laminated dough of the invention can be prepared according to methods known in the art.

In one embodiment, a layer dough can be prepared by combining all ingredients and mixing until the layer dough is fully developed. Fully developed refers to transforming the mixture into a cohesive mass such that the layer dough is substantially homogenous and soft.

A layer dough can be mixed in any mixer suitable for combining the ingredients and mixing until the layer dough is fully developed. An example of a suitable mixer includes a vertical mixer (Hobart, Troy, Ohio). During mixing, the layer dough of the invention is desirably maintained at a temperature that maintains the structure of the layer dough to facilitate handling of the layer dough. Typically the temperature should be in a range of about 50° F. to about 70° F.

Preferably the mixer is equipped with a refrigeration system such as, for example, a jacketed glycol coolant to maintain the layer dough of the invention within the desirable temperature range.

To maintain the desirable temperature, the water added should be at a temperature suitable for maintaining the dough at the desirable temperature. Preferably the water is chilled to a temperature of about 45° F. to about 60° F. To further control the temperature, a portion of the water can be replaced by shaved or crushed ice. The amount and size of the shaved or crushed ice can be determined so that the ice can melt in the water, the dough, or both during mixing without leaving ice in the mixed dough. The size of the shaved or crushed ice can typically be up to about 1 cm. The portion of water that is replaced by shaved ice can be up to about 70 weight percent of total water.

The layer dough is mixed at a speed and time that are suitable for fully developing the layer dough. For example, the ingredients can initially be mixed on low speed for about 30 seconds and then mixed on medium speed for about 8 minutes to about 12 minutes. These times and speeds are merely illustrative and can vary depending on the amount of laminated dough being mixed and on the type of mixer.

After mixing, a layer dough desirably has a temperature of about 50° F. to about 70° F., preferably about 55° F. to about 65° F.

Within 10 minutes of being mixed to full development, a layer dough desirably has a consistency of about 400 Brabender units (B.U.) to about 1200 B.U., preferably about 800 B.U. to about 1000 B.U. This dough consistency can be determined by a Farinograph measurement. Farinograph measurements are known to one of skill in the art and refer to a dough's resistance to mixing. A Farinograph measurement involves determining the peak amplitude of the layer dough.

A layer dough prepared for a laminated dough of the invention is typically softer than the doughs used in known croissants, which have a consistency of about 850 B.U. to about 1300 B.U., typically 1000 B.U. to 1200 B.U.

After mixing, the dough is sheeted or extruded to prepare the dough for the addition of laminating fat. Dough can be handled in individual pieces for example, or as a continuous sheet. A dough can be sheeted on a continuous or reversible sheeter.

In another embodiment, a layer dough can be prepared by first preparing a preferment or sponge. This layer dough can be prepared according to the method described above with the following modifications. To prepare a sponge, water at a temperature of about 60° F. to about 65° F., sugar, and yeast are mixed until the yeast substantially dissolves and then flour is added, and the mixture of water, sugar, yeast, and flour are mixed until the flour is incorporated. Generally this mixing step is performed at a low speed of a mixer. Once the flour is incorporated, the sponge is mixed at a speed effective to provide kneading of the dough for a time effective to obtain a homogenous mixture. The sponge is then placed at about room temperature for an amount of time effective to develop active fermentation and approximately double in size. In some instances, the sponge can be left at refrigerated or room temperature for about 1 hour to about 3 hours. Sponges can also be staged at refrigerated temperatures for longer periods.

In one embodiment, the sponge is about 15 to 20 weight percent of the laminated dough of the invention.

The sponge can be added to all remaining ingredients, and all ingredients can be mixed until fully developed. The mixing procedure is carried out in the same manner as for the layer dough prepared without a sponge.

In yet another embodiment, a layer dough can be prepared by first preparing a sponge as described above, except the sponge does not include flour, and timing is determined by the development of flavor components. Regardless of the method of preparing the layer dough (e.g., straight dough method or by preparing a preferment or sponge), the final laminated dough is preferably maintained under conditions suitable to avoid proofing of the dough. For example, the dough and ingredients can be maintained at a temperature at which yeast is inactive, thereby avoiding proofing of the dough during the process of preparing the dough.

Rolling in a Shortening

According to the invention, roll-in shortening or butter is applied onto the surface of the layer dough to prepare a sheet dough. This is followed by a folding process, completely enveloping the fat within the dough while attempting to maintain both the layer dough and roll-in fat as distinct layers. The sheet dough can be repeatedly folded and sheeted, using techniques know in the art, to provide a desired number of shortening layers in the laminated product. The term "rolling" as used in the context of this invention includes the incorporation and maintenance of layers of shortening between adjacent layers of dough. Shortening can be rolled into the dough to provide a laminated dough of the invention having about 8 to about 64 shortening layers, preferably about 16 to about 54 shortening layers, and more preferably about 36 to about 48 shortening layers.

Between sheeting steps, the dough can be refrigerated to avoid having the shortening melt into the layer dough and to allow the layer dough to rest so it can sheet without tearing. In one embodiment, the dough is rested for periods of time during the sheeting process. Preferably, the dough is rested at a preselected temperature (for example, at a temperature below about 50° F.) for a desired time period (for example, 30 minutes per rest). The dough can be rested a desired number of times during the process, depending upon such factors as the number of folds in the process, the severity of the sheeting operation, and the like. Typically, resting is performed at a temperature that restricts the activity of the yeast in the dough, while allowing the dough to relax between periods of mechanical stress as a result of mixing and sheeting processes. In one embodiment, the dough is rested at a temperature of about 50° F. or less, preferably at a temperature of about 20° F. to about 45° F.

To prepare the shortening to be rolled into the layer dough, the shortening can be creamed. Creaming shortening includes mixing shortening in a manner effective to soften the shortening. Preferably the shortening is softened to an extent that it simulates extruded shortening in a continuous application, as known in the art.

The creaming process can be performed in a mixer.

If the shortening is undermixed, then undesirable lumps of shortening can remain in the creamed shortening. But if the shortening is overmixed, then the shortening can break down resulting in free water.

In one instance, the shortening can be creamed by mixing the shortening at low speed of a mixer for about 1 minute to about 2 minutes and then mixing the shortening at medium speed of a mixer for about 3 minutes to about 4 minutes or more.

After creaming, the shortening is applied as either a premeasured proportion of each dough piece or extruded onto a continuous flow of sheeted dough.

After sheeting, the laminated dough is cooled to a temperature suitable for accepted technique for puffed-pastry, croissant or Danish. In one embodiment, the shortening that is creamed and sheeted includes butter. When butter is rolled into a dough to prepare a laminated dough of the invention, the butter can be at a temperature of about 48° F. to about 68° F., preferably about 50° F. to about 65° F., and more preferably about 50° F. to about 55° F.

After completion of the folding and sheeting sequence, the laminated dough of the invention can be rolled and shaped.

In one embodiment, a laminated dough having 48 shortening layers can be prepared. To prepare a laminated dough having 48 shortening layers, the following procedure can be used. First, to roll the shortening into the dough, a slab of shortening can be placed onto a slab of layer dough, and the layer dough can be wrapped up and over the shortening. The layer dough and shortening can be sheeted to provide a sheet dough having a thickness of about 6 mm to about 9 mm, preferably about 6.5 mm to about 8.5 mm, and more preferably about 7 mm to about 8 mm. The sheet dough can be folded into four, and the folded sheet dough can be sheeted to provide a thickness of about 6 mm to about 9 mm, preferably about 6.5 mm to about 8.5 mm, and more preferably about 7 mm to about 8 mm. The sheet dough can be folded into four again, and then the folded sheet dough can be sheeted to provide a thickness of about 6 mm to about 9 mm, preferably about 6.5 mm to about 8.5 mm, and more preferably about 7 mm to about 8 mm. The sheet dough can be folded into three, and the folded sheet dough can be placed in a cooler to rest for an amount of time effective to avoid tearing and disruption of the layers through subsequence sheeting. In some instances, the amount of time can be about 30 minutes to about 60 minutes and preferably about 30 minutes to about 40 minutes. The dough can be rested in this manner between each folding stage.

After cooling, the sheet dough is sheeted to provide a laminated dough of the invention having a thickness of about 4 mm to about 7 mm, preferably about 4.5 mm to about 5.5 mm, and more preferably about 4 mm to about 5 mm.

Shaping a Laminated Dough of the Invention

The laminated dough can then be rolled and formed into desirable shapes such as the shapes typically used for croissants, Danishes, and the like. The rolled and shaped laminated dough does not need to be flattened by, for example, passing between rollers to prepare a desirable baked product.

A laminated dough of the invention can be formed into, for example, a croissant, a Danish, and the like. In one embodiment, a laminated dough of the invention is formed into a croissant by being run through a croissant make-up machine such as, for example, a make-up machine manufactured by Rondo (Burgdorf, Switzerland).

The formed laminated dough can be transferred to any container suitable for freezing.

The laminated dough of the invention does not need to be stored in a package having a modified atmosphere.

Freezing a Laminated Dough of the Invention

After a laminated dough of the invention is formed into a desirable shape and deposited into a container, the laminated dough of the invention is frozen to a temperature suitable for shipping the laminated dough of the invention. A laminated dough of the invention is preferably frozen as quickly and completely as possible. A laminated dough of the invention can be frozen at a temperature of about −10° F. to about −35° F. Generally this freezing process reduces the temperature of the laminated dough of the invention to at least 5° F.

Baked Product

A baked product of the invention can be prepared without thawing and proofing the laminated dough of the invention before baking the laminated dough. That is, the laminated dough of the invention can be removed from the freezer and be baked immediately in an oven without undergoing a thawing step. The oven can be preheated or cold.

In one embodiment, the laminated dough of the invention includes a croissant. A frozen croissant can be baked at a temperature of about 325° F. to about 400° F., depending upon the conditions of the oven.

Before baking, a laminated dough of the invention can be brushed with a glaze to provide the baked product with a rich finish. An example of a glaze in accordance with the invention is an egg wash, which typically includes egg and water.

A baked product of the invention has a baked specific volume of at least 2.5 cc/g, preferably a baked specific volume of at least 3 cc/g. A baked product of the invention preferably has a baked specific volume of about 4 cc/g to about 6 cc/g and more preferably has a baked specific volume of about 5 cc/g to about 6 cc/g.

This invention will be further characterized by the following examples. These examples are not meant to limit the scope of the invention, Examples of suitable thickening agents include pectin, alginate, carrageenan, carboxymethyl cellulose, methyl cellulose, hydroxypropyl cellulose, hydroxypropylmethyl cellulose, and the like, which has been fully set forth in the foregoing description. Variations within the scope of the invention will be apparent to those skilled in the art.

EXAMPLES

Example 1

A Croissant Prepared from a Laminated Dough of the Invention

To prepare a croissant from a laminated dough of the invention, the laminated dough was formulated according to Table 3. The laminated dough included 48 shortening layers.

TABLE 3

Ingredients in a Laminated Dough of the Invention Formed into a Croissant

| Ingredient | Weight Percent |
| --- | --- |
| Flour | 36.15 |
| Yeast | 2.07 |
| Salt, with or without filler | 0.70 |
| Gluten | 0.85 |
| Butter in flour-water layers | 7.80 |
| Water, food contact | 10.59 |
| Guar Gum | 0.21 |
| Pectin (GENU ® Freeze) | 0.64 |
| Sugar | 2 |
| Ice | 10.36 |
| Sodium Stearoyl Lactylate | 0.18 |
| DATEM | 0.07 |
| Azodicarbonamide | 0.001 |
| Ascorbic Acid | 0.002 |
| Butter in shortening layers | 27.6 |
| Total | 100.00 |

The ingredients for the formulation were provided as follows: Flour (HG53; ADM Milling, Minneapolis, Minn.); Yeast (Fresh Yeast; Fleischmann's Yeast); Salt (Star Flake Dendritic Salt; Morton International, Philadelphia, Pa.); Gluten (Vital Wheat Gluten; Midwest Grain Prod. Inc.); Butter (Assoc. Milk Producers); Guar Gum (Supercol U; Hercules Inc., Copenhagen Pectin A/S Denmark); Pectin (GENU FREEZE®; Hercules Inc., Copenhagen Pectin A/S Denmark); Sugar (Granulated Sugar; Colonial Sugar Co.); Sodium Stearoyl Lactylate (Paniplex SK #115-101; ADM Arkday); Datem (Panodan 122-K; Danisco Cultor, Copenhagen, Denmark); Azodicarbonamide (Benchmate ADA-PAR, Fleischmann's Yeast); and Ascorbic Acid (Ascorbic Acid #60456-5525; Roche Vitamins, Basel, Switzerland).

To prepare a croissant from a laminated dough of the invention, the following procedure was used. A dough was prepared as follows. All ingredients (flour, yeast, salt, gluten, guar gum, pectin, sugar, sodium stearoyl lactylate (SSL), diacetyl tartaric acid esters (DATEM), butter at a temperature of about 50° F., and water including 50 weight-percent ice and being at a temperature of about 60 to 65° F., azodicarbonamide (ADA), and ascorbic acid (AA)), except for the butter for the shortening layers, were mixed at low speed until blended, which was about 30 seconds. All ingredients were then mixed at medium speed until fully developed, which was about 8.5 minutes.

The dough was placed in a sheeter and sheeted into a slab. The sheeter was operated first with a distance of about 30 mm between the conveyor belt and roller and the distance was gradually reduced to about 9 mm.

The slab of dough was cooled to a temperature of about 50° F. in a freezer.

In the meantime, the butter to be used in the butter layers was creamed by mixing the butter for about 30 seconds at low speed and then for about 2 minutes at medium speed. The creamed butter was placed in the middle of parchment paper, covered with parchment, and sheeted into a slab. The sheeter was operated first with a distance of about 30 mm and then the distance was gradually changed to about 12 mm.

The slab of butter was cooled to a temperature of about 50° F.

To prepare the laminated dough, the slab of butter was placed in the middle of the slab of dough. The layer dough was wrapped around the butter. The wrapped butter was sheeted until about 5 mm thick by starting at a distance of about 30 mm and reducing gradually to a distance of about 8 mm. The sheeted dough was folded into four, and the folded dough was sheeted until about 5 mm thick by starting at a distance of about 30 mm and reducing gradually to a distance of about 8 mm. The sheeted dough was folded into 4 and then rested in a cooler at a temperature of about 40° F. for about 30 minutes.

The cooled sheeted dough was again sheeted until about 5 mm thick by starting at a distance of about 30 mm and going gradually to a distance of about 8 mm. The sheeted dough was folded into 3 and then rested in a cooler at a temperature of about 40° F. for about 30 minutes. The cooled dough was again sheeted until about 3 mm to about 4 mm thick by starting at a distance of about 30 mm and going gradually to a distance of about 3 mm. This sequence of sheeting and folding provided a laminated dough having 48 shortening layers.

The laminated dough was rolled into a carrier roll, and the rolled dough was unwound onto a croissant make-up machine. The croissant make-up machine first reduced the dough to about 2 to about 3 mm thick. The dough was then cut into triangles and rolled. Preferably the dough was reduced to about 2 mm; however, if some tearing of the laminated dough occurred, then the thickness was reduced to about 3 mm. The final croissant weighed about 55 g to about 60 g and had a specific volume of about 1.0 cc/g to about 1.2 cc/g.

The croissants were frozen by storage overnight at a temperature of about −10° F.

To bake the croissants, the frozen croissants were removed from the freezer and brushed with an egg wash. Within 0 to 2 minutes from being removed from the freezer, the croissants were baked in an oven preheated to 377° F. for about 20 minutes to about 25 minutes.

The final baked product had a golden brown color and a specific volume of about 5.5 cc/g. The grain was typical of a croissant.

Example 2

Another Croissant Prepared from a Laminated Dough of the Invention

To prepare a croissant from a laminated dough of the invention, the laminated dough was formulated according to Table 4. This laminated dough included 48 shortening layers and was formulated from a sponge.

TABLE 4

Ingredients in a Laminated Dough of the Invention Formed into a Croissant

| Ingredient | Weight Percent |
| --- | --- |
| Sponge | 17.76 |
| Flour (42.37%) | |
| Yeast (5%) | |
| Sugar (10.17%) | |
| Water (42.37%) | |
| Flour | 30.99 |
| Salt, with or without filler | 0.60 |
| Gluten | 0.73 |
| Butter in flour-water layers | 6.69 |
| Water, food contact | 7.68 |
| Guar Gum | 0.18 |
| Pectin (GENU ® Freeze) | 0.63 |
| Sugar | 2.37 |
| Ice | 8.48 |
| Sodium Stearoyl Lactylate | 0.15 |
| DATEM | 0.06 |
| Azodiacarbonamide | 0.002 |
| Ascorbic Acid | 0.002 |
| Butter in shortening layer | 23.7 |
| Total | 100.00 |

The ingredients used in the formulation can be obtained from the manufacturers described in Example 1.

To prepare a croissant from a laminated dough of the invention, the procedure described in Example 1 was used with the following modifications. The dough was prepared from a sponge instead of initially mixing all of the ingredients together.

To prepare the sponge, 42.37 weight-percent water at a temperature of about 60 and 65° F., 10.17 weight-percent sugar, and all of the yeast were mixed at low speed for about 30 seconds and then 42.37 weight-percent flour was added, and the mixture was mixed at low speed until all of the flour was incorporated, which was about ½ minute. Once the flour was incorporated, the mixture was mixed at high speed for about 3 minutes. The sponge was placed in a bowl and left at room temperature for about 1.5 hours to about 1.75 hours.

To prepare the dough from the sponge, all remaining ingredients except for the butter for the shortening layer were mixed with the sponge at low speed until blended, which was about 30 seconds.

The sequence then proceeded as described in Example 1.

The final baked product had a golden brown color and a specific volume of about 4 cc/g to about 4.5 cc/g. The grain was typical of a croissant.

Example 3

A Danish Prepared From a Laminated Dough of the Invention

To prepare a Danish from a laminated dough of the invention, the laminated dough was formulated according to Table 5. The laminated dough included 48 shortening layers and was prepared from a sponge.

TABLE 5

Ingredients in a Laminated Dough of the Invention Formed into a Danish

| Ingredient | Weight Percent |
|---|---|
| Sponge | 13.53 |
| Flour (42.37%) | |
| Yeast (5.08%) | |
| Sugar (10.17%) | |
| Water (42.37%) | |
| Flour* | 33.16 |
| Salt, with or without filler | 0.64 |
| Gluten | 0.78 |
| Butter in flour-water layers | 5.28 |
| Water, food contact | 7.39 |
| Fresh whole eggs | 4.22 |
| Guar Gum | 0.19 |
| Pectin (GENU ® -Freeze) | 0.58 |
| Sugar | 4.86 |
| Ice | 9.08 |
| Sodium Stearoyl Lactylate | 0.17 |
| DATEM | 0.07 |
| Azodicarbonamide | 0.002 |
| Ascorbic Acid | 0.002 |
| Butter in shortening layer | 20.06 |
| Total | 100.00 |

The ingredients used in the formulation can be obtained from the manufacturers described in Example 1, and the eggs were obtained from M.G. Waldbaum Company (Easy Eggs #75925-88190, 88630).

To prepare a Danish from a laminated dough of the invention, the procedure described in Example 2 was used with the following modifications. Instead of forming the laminated dough of the invention with a croissant make-up machine, a Danish dough was rolled by a sheeter and then cut and shaped by hand into a variety of shapes.

The final Danish weighed about 55 g to about 60 g and had a specific volume of about 1.0 cc/g to about 1.2 cc/g as dough.

The Danishes were frozen by storage overnight at a temperature of about −10° F.

To bake the Danishes, the frozen Danishes were removed from the freezer and brushed with an egg wash. Within 0 to 2 minutes from being removed from the freezer, the Danishes were baked in an oven preheated to 377° F. for about 15 to about 25 minutes.

The final baked product was golden brown in color and had a specific volume of about 3.0 cc/g to about 3.5 cc/g.

Example 4

The Effect of Cysteine on a Laminated Dough of the Invention

To determine the effect of cysteine on a laminated dough of the invention, a laminated dough was prepared according to Example 1 with one modification. The Example 1 formula was modified by adding 20 ppm cysteine based on flour, which is 0.001 weight percent based on the total formula.

The laminated dough including cysteine was baked according to Example 1. The final baked product had a specific volume of about 3.5 cc/g to about 4 cc/g. Further, the grain of the baked product was not uniform and included large holes in the croissant interior. Thus, the laminated dough including cysteine showed a specific volume less than the laminated dough that does not include added cysteine. Moreover, the grain of the laminated dough including cysteine showed a less desirable grain or croissant texture than the laminated dough that did not include added cysteine.

Example 5

Dough Consistency of the Dough for the Flour-Water Layer for a Laminated Dough of the Invention Dough consistency can be determined by a Farinograph measurement. A Farinograph measurement measures a dough's resistance to mixing. A Farinograph is a recording dough mixer. It measures the power needed to mix a dough at a constant speed. Each dough measured provides a characteristic curve that is influenced by the ingredients used in the dough and by the mixing of the dough before running the Farinograph.

The samples studied were formulated according to Examples 1 and 2 except that the butter was not rolled into the dough used for the flour-water layers. That is, each sample was the layer dough used to provide the flour-water layers in a laminated dough of the invention.

All samples were evaluated immediately after mixing.

To make the Farinograph measurement, a 480 gram sample of each of the samples was placed in a jacketed bowl, which was at a temperature of 60° F., equipped with a sigma blade (C. W. Brabender Instruments, Inc. South Hackensack, N.J.). The sample was placed in a Farinograph (C. W. Brabender Instruments, Inc. South Hackensack, N.J.) and measurements were taken for a time period effective for determining a peak amplitude.

The Farinograph was operated according to the manufacturer's instructions. The peak amplitude was identified and recorded. The peak amplitude provides the dough consistency.

The peak amplitudes obtained for each sample are shown in Table 6.

TABLE 6

Peak Amplitudes of Samples

| Sample | Peak Amplitude |
|---|---|
| Example 1 | 600–660 B.U.* |
| Example 2 | 600 B.U. |

*3 samples having the formulation of Example 1 were studied, and the samples showed peak amplitudes in this range.

Example 6

Butter Croissant

To prepare a butter croissant from a laminated dough of the invention, the laminated dough was formulated according to Table 7. This laminated dough included 36 layers of shortening.

TABLE 7

Ingredients in a Laminated Dough of the Invention Formed into a Croissant

| Ingredient | Weight Percent |
|---|---|
| Flour | 36.31 |
| Yeast | 2.08 |
| Salt, with or without filler | 0.73 |

TABLE 7-continued

Ingredients in a Laminated Dough of the
Invention Formed into a Croissant

| Ingredient | Weight Percent |
| --- | --- |
| Gluten | 2.90 |
| Butter in flour-water layers | 5.81 |
| Water, food contact | 16.46 |
| Guar Gum | 0.21 |
| Pectin (GENU ® Freeze) | 0.63 |
| Sugar | 2.18 |
| Ice | 3.87 |
| Sodium Stearoyl Lactylate | 0.19 |
| DATEM | 0.08 |
| Ascorbic Acid | 0.002 |
| Butter in shortening layers | 28.56 |
| Total | 100.00 |

The ingredients for the formulation were provided as described for Example I above.

To prepare a butter croissant from a laminated dough of the invention, the following procedure was used. A dough was prepared as follows. All ingredients (flour, yeast, salt, gluten, guar gum, pectin, sugar, sodium stearoyl lactylate (SSL), diacetyl tartaric acid esters (DATEM), butter at a temperature of about 50° F., and water including ice and being at a temperature of about 60° to 65° F., azodicarbonamide (ADA), and ascorbic acid (AA)), except for the butter for the shortening layers, were mixed at a slow speed until blended, which was about 2 minutes. All ingredients were then mixed at high speed until fully developed, which was about 10 minutes. Mixing was done using a horizontal bar commercial mixture. The dough temperature was about 55° to 65° F. after mixing.

Butter used in the shortening layers was preblended by blending the butter for about 12 minutes in a spiral mixer on low speed. Up to 6% flour can be added to the butter to absorb water.

To prepare the laminated dough, the dough was extruded through a Rademaker three roll extruder. The butter for the shortening layers was coextruded, then covered by a second layer of dough. The dough was sheeted, and lapped and sheeted again to 8 shortening layers (4×2). The dough was then cut into books and put on sheet trays, then covered with a plastic film to prevent drying.

The slabs of laminated dough were chilled and rested in a 35° F. resting chamber for about 3 hours.

When the dough temperature reached about 36° to 42° F. it was brought back to the line where it was lapped again and sheeted. This sequence of lapping and sheeting provided a laminated dough having 24–48 shortening layers.

The dough was then rolled into a croissant form and immediately conveyed to a commercial freezer at −30° to −40° F. The dough pieces were stored at 0° F. or lower. The specific volume of the dough at this stage was 1.0 cc/g to 1.2 cc/g.

To bake the croissants, the frozen butter croissants were removed from the freezer and baked without thawing or proofing. When exiting the freezer, the dough pieces had a temperature of about 0° F. to −15° F. The final baked product had a specific volume of about 5.5–6.0 cc/g. The grain and appearance were typical of a butter croissant.

Example 7

FTO Croissant

To prepare a croissant from a laminated dough of the invention, the laminated dough was formulated according to Table 8. This laminated dough included 48 layers of shortening (4×4×3).

TABLE 8

Ingredients in a Laminated Dough of the
Invention Formed into a Croissant

| Ingredient | Weight Percent |
| --- | --- |
| Flour | 35.30 |
| Yeast | 2.12 |
| Salt, with or without filler | 0.72 |
| Gluten | 2.16 |
| Buffer in flour-water layers | 5.90 |
| Water, food contact | 10.86 |
| Guar Gum | 0.21 |
| Pectin (GENU ® Freeze) | 0.65 |
| Sugar | 2.88 |
| Ice | 10.62 |
| Sodium Stearoyl Lactylate | 0.18 |
| DATEM | 0.07 |
| Azodicarbonamide | 0.002 |
| Ascorbic Acid | 0.002 |
| Buffer in shortening layers | 28.33 |
| Total | 100.00 |

The ingredients for the formulation were provided as described above for Example I. The procedure used to prepare the dough was described above in Example I. The specific volume of the final, baked croissant was 4.8–5.2 cc/g.

Example 8

FTO Croissant

To prepare a croissant from a laminated dough of the invention, the laminated dough was formulated according to Table 9. This laminated dough included 48 layers of shortening (4×4×3).

TABLE 9

Ingredients in a Laminated Dough of the
Invention Formed into a Croissant

| Ingredient | Weight Percent |
| --- | --- |
| Flour | 37.09 |
| Yeast | 2.12 |
| Salt, with or without filler | 0.72 |
| Gluten | 0.87 |
| Butter in flour-water layers | 5.90 |
| Water, food contact | 10.63 |
| Guar Gum | 0.22 |
| Pectin (GENU ® Freeze) | 0.65 |
| Sugar | 2.38 |
| Ice | 10.86 |
| Sodium Stearoyl Lactylate | 0.19 |
| DATEM | 0.07 |
| Azodicarbonamide | 0.002 |
| Ascorbic Acid | 0.002 |
| Röhm "Veron CLX" Enzyme (75 ppm base flour) | 0.003 |
| Butter in shortening layers | 28.3 |
| Total | 100.00 |

The ingredients and procedure used were as described above for Example I, with the exception of the addition of Röhm "Veron CLX" Enzyme (75 ppm base flour). The specific volume of the final, baked croissant was 5.2–6.0 cc/g.

Example 9

FTO Croissant

To prepare a croissant from a laminated dough of the invention, the laminated dough was formulated according to Table 10. This laminated dough included 24 layers of shortening.

TABLE 10

Ingredients in a Laminated Dough of the Invention Formed into a Croissant

| Ingredient | Quantity (grams) | Weight Percent of Total Formula |
|---|---|---|
| Flour (12 weight % protein) | 100.00 | 37.39 |
| Yeast | 5.73 | 2.14 |
| Salt, with or without filler | 1.94 | 0.73 |
| Gluten | 4.0 | 1.50 |
| Pectin (Hercules) | 1.50 | 0.56 |
| Water | 26.50 | 9.91 |
| Sugar | 4.0 | 1.50 |
| Non-Fat Dry Milk | 1.27 | 0.47 |
| Fresh Egg | 12.73 | 4.76 |
| Honey | 4.0 | 1.50 |
| Guar Gum | 0.573 | 0.21 |
| Vanilla Flavor | 0.08 | 0.03 |
| Butter Flavor | 0.03 | 0.01 |
| Sachrin/cycamate Solution (artificial sweetener) | 2.5 | 0.93 |
| Ice | 27.0 | 10.10 |
| Butter | 4.0 | 1.50 |
| Margarine | 4.0 | 1.50 |
| Sodium Stearoyl Lactylate | 0.50 | 0.19 |
| DATEM | 0.20 | 0.07 |
| Azodicarbonamide | 0.004 | 0.00 |
| Ascorbic Acid | 0.006 | 0.00 |
| Röhm "Veron CLX" Enzyme (75 ppm base flour) | 0.0075 | 0.00 |
| Roll-in Fat |  | 25.00 |
| Total |  | 100.00 |

The ingredients used to prepare the dough were as described above for Example I.

To prepare a croissant from a laminated dough of the invention, the following procedure was used. A dough was prepared as follows. All ingredients except butter for the layer dough or for the roll-in fat, salt and sugar were mixed in a Trivi spiral mixer for 5 minutes on speed 2.

Butter for the layer dough, salt and sugar was then added, and the mixing was completed by mixing for an additional 8 to 10 minutes. The dough exit temperature was 9° to 13° Celsius (C.), the dough temperature resulting from the temperature of the ingredients.

A combination of butter and shortening was used for the roll-in fat comprising the shortening layers. The butter/shortening was preblended in a spiral mixer to prepare the butter/shortening for laminating the dough. Up to 10% flour can be added to absorb water. The fat temperature was 9° to 11° C.

To prepare the laminated dough, the dough was extruded through a Trivi three roll extruder and the butter was coextruded and covered by a second layer of dough. The dough was sheeted and lapped to 4 layers, then sent in a continuous fashion to an overhead cooling/resting chamber set at 35° F. The dough was rested in the cooling/resting chamber for about 2 hours.

The cooled sheeted dough was again lapped and sheeted. This sequence of lapping and sheeting provided a laminated dough having a total amount of 24 to 36 shortening layers.

The laminated dough was then rolled into a croissant form, using a croissant make-up machine. The formed dough was then rested for about 30 to 45 minutes. The dough was then hand stretched and indexed into paper liners. At this point, the room temperature was about 60° F. to 65° F., and this room temperature, combined with the cold dough temperature, prevented the dough from proofing during this resting step. The specific volume of the dough at this stage was 1.0 cc/g to 1.2 cc/g.

The product was then conveyed to a blast freezer at −30° F. to −40° F. The dough pieces exited the blast freezer at 0° F. to −15° F. Sheets of frozen sweet croissants were then bulk packaged for shipment and storage. All product was stored at 0° F. or lower.

To bake the croissants, the frozen croissants were removed from the freezer and were baked in an oven preheated to 377° F. for about 20 minutes to about 25 minutes. The final baked product had a specific of 3.5 to 4.5 cc/g.

Example 10

FTO Danish

To prepare a Danish from a laminated dough of the invention, the laminated dough was formulated according to Table 11. This laminated dough included 24 layers of shortening.

TABLE 11

Ingredients in a Laminated Dough of the Invention Formed into a Danish

| Ingredient | Quantity (grams) | Weight Percent of Total Formula |
|---|---|---|
| Flour | 1570.6 | 35.71 |
| Yeast | 90 | 2.05 |
| Salt, with or without filler | 23 | 0.52 |
| Gluten | 36.83 | 0.84 |
| Butter | 250 | 5.68 |
| Eggs | 200 | 4.55 |
| Non-Fat Dry Milk | 60 | 1.36 |
| Water, Food Contact | 420 | 9.55 |
| Guar Gum | 9 | 0.20 |
| Pectin (Hercules GENU ™ Type Freeze) | 27.63 | 0.63 |
| Sugar | 100 | 2.27 |
| Ingredient Ice - Potable | 400 | 9.09 |
| Sodium Stearoyl Lactylate (0.5% base flour) | 7.85 | 0.18 |
| DATEM (0.2% flour base) | 3.14 | 0.07 |
| Azodicarbonamide (40 ppm flour base) | 0.06 | 0.001 |
| Ascorbic Acid (60 ppm flour base) | 0.09 | 0.002 |
| Röhm "Veron CLX" Enzyme (75 ppm base flour) | 0.12 | 0.003 |
| Roll-in Fat | 1200 | 27.28 |
| Total |  | 100.00 |

The ingredients were obtained as described above for Example 8. The laminated dough was prepared according to the procedure described in Example 3. The specific volume of the baked FTO Danish was 3.0 cc/g to 3.5 cc/g.

It should be noted that, as used in this specification and the appended claims, the singular forms "a," "an," and "the" include plural referents unless the content clearly dictates otherwise. Thus, for example, reference to a composition containing "a water-binding agent" includes a mixture of two or more water-binding agents.

Although embodiments of the invention have been described above, it is not limited thereto, and it will be apparent to persons skilled in the art that numerous modifications and variations form part of the present invention insofar as they do not depart from the spirit, nature, and scope of the claimed and described invention.

We claim:

1. A frozen unproofed laminated dough product comprising:
   a). A layer dough having a consistency of between about 400 B.U. to about 1300 B.U., comprising:
      i. flour in an amount effective for providing structure to the layer dough;
      ii. a water-binding agent in a an amount effective for hydrating the layer dough;
      iii. a leavening agent in an amount effective for leavening a baked product prepared from the laminated dough;
      iv. a fat source in an amount effective for providing desirable physical texture to the layer dough; and
      v. water in an amount effective for providing a flour-to-water ratio in a range of about 1.5:1 and about 2.5:1;
   b). shortening layers, the shortening layers alternate with the layer dough; and
   c). a dough specific volume of about 0.8 cc/g to about 1.4 cc/g, wherein the frozen unproofed dough prepares a baked product having a specific volume of at least 3 cc/g when baked without being thawed or proofed before baking.

2. The laminated dough according to claim 1, wherein the laminated dough is shelf stable for about 4 months at freezing temperatures, wherein the freezing temperatures are less than about 10° F.

3. The laminated dough according to claim 1, wherein the flour comprises a high protein flour.

4. The laminated dough according to claim 3, wherein the high protein flour comprises flour having a protein content of about 12 weight percent to about 16 weight percent protein.

5. The laminated dough according to claim 1, wherein the flour comprises a hard wheat winter flour, a hard wheat spring flour, or a combination thereof, wherein the flour comprises about 10 weight percent to about 16 weight percent protein, the weight percent protein being based on the weight of flour in the laminated dough.

6. The laminated dough according to claim 1, wherein the flour is present in an amount of about 30 weight percent to about 50 weight percent, the weight percent being based on total weight of the laminated dough.

7. The laminated dough according to claim 1, wherein the flour is present in an amount sufficient to provide a total protein content of about 5 weight percent to about 8 weight percent, the total protein content being based on protein from all sources in the dough, and the weight percent being based on total weight of the laminated dough.

8. The laminated dough according to claim 1, further comprising a protein supplement.

9. The laminated dough according to claim 8, wherein the protein supplement comprises an egg protein, a dairy protein, a wheat protein, or a combination thereof.

10. The laminated dough according to claim 9, wherein the protein supplement comprises gluten.

11. The laminated dough according to claim 8, wherein the protein supplement is present in an amount of about 0.4 weight percent to about 2.5 weight percent based on the total weight of the laminated dough.

12. The laminated dough according to claim 1, wherein the water-binding agent is selected from gelling agents, thickening agents, and combinations thereof.

13. The laminated dough according to claim 12, wherein the gelling agents are selected from pectin, alginate, carrageenan, carboxymethylcellulose, methyl cellulose, hydroxypropyl cellulose, hydroxypropylmethyl cellulose, and combinations thereof.

14. The laminated dough according to claim 13, further comprising an enzyme, wherein the enzyme is selected from amylases, transglutaminases, hemicellulases, and combinations thereof.

15. The laminated dough according to claim 12, wherein the gelling agents are selected from gelatin, hydrolyzed gelatin, collagen, and combinations thereof.

16. The laminated dough according to claim 12, wherein the thickening agents comprises one or more gums selected from guar gum, xanthan gum, cellulose gum, gum arabic, and combinations thereof.

17. The laminated dough according to claim 1, wherein the water-binding agent is present in an amount of about 0.2 weight percent to about 2 weight percent, the weight percent being based on weight of the laminated dough.

18. The laminated dough according to claim 1, wherein the leavening agent comprises yeast.

19. The laminated dough according to claim 18, wherein the yeast is present in an amount of about 0.5 weight percent to about 6 weight percent, the weight percent being based on the weight of the laminated dough.

20. The laminated dough according to claim 1, wherein the fat source comprises butter, shortening, hydrogenated vegetable oil, vegetable oil, or a combination thereof.

21. The laminated dough according to claim 1, wherein the fat source is present in the layer dough in an amount of about 2 weight percent to about 10 weight percent, the weight percent being based on the weight of the laminated dough.

22. The laminated dough according to claim 1, wherein the shortening layers comprise butter.

23. The laminated dough according to claim 1, wherein the shortening layers comprise shortening in an amount of about 15 weight percent to about 35 weight percent, the weight percent being based on weight of the laminated dough.

24. The laminated dough according to claim 1, wherein the dough specific volume is about 1.0 cc/g to about 1.2 cc/g.

25. The laminated dough according to claim 1, wherein the laminated dough prepares a baked product having a specific volume of about 3 cc/g to about 6 cc/g.

26. The laminated dough according to claim 1, further comprising sugar and salt.

27. The laminated dough according to claim 1, further comprising an emulsifier, a dough-developing agent, a nutritional supplement, a flavoring, a shelf-life stabilizer, an organic acid, an oxidizer, or a combination thereof.

28. The laminated dough according to claim 1, further comprising an emulsifier, the emulsifier comprising sodium stearoyl lactylate, diacetyl tartaric acid ester of mono- and diglycerides, or a combination thereof.

29. The laminated dough according to claim 1, further comprising a shelf-life stabilizer, the shelf-life stabilizer comprising ascorbic acid.

30. The laminated dough according to claim 1, wherein the laminated dough is substantially free of cysteine.

31. The laminated dough according to claim 1, wherein the flour is substantially free of a modified starch.

32. The laminated dough according to claim 1, wherein the laminated dough comprises a total fluidizer content of about 57 weight percent to about 70 weight percent, the weight percent being based on weight of the laminated dough.

33. The laminated dough according to claim 1, wherein the dough layer is capable of withstanding at least one freeze/thaw cycle, wherein the freeze/thaw cycle comprises a temperature fluctuation of the laminated dough between about 32° F. and about 50° F.

34. A baked product prepared from the dough of claim 1.

35. The laminated dough according to claim 1, wherein the ratio of water-binding agent to water is from about 0.005:1 to about 0.05:1.

36. The laminated dough according to claim 1, wherein the laminated dough is not packaged under a modified atmosphere.

37. A frozen unproofed laminated dough comprising:
   a) a layer dough having a consistency of between about 400 B.U. to about 1300 B.U., comprising:
      i) flour in an amount of about 30 weight percent to about 50 weight percent;
      ii) a water-binding agent present in an amount of about 0.2 weight percent to about 2 weight percent;
      iii) a leavening agent in an amount of about 0.5 weight percent to about 6 weight percent;
      iv) a fat source in an amount of about 2 weight percent to about 10 weight percent; and
      v) water in an amount effective for providing a flour-to-water ratio in a range of about 1.5:1 to about 2.5:1;
   b) shortening layers alternating with the layer dough, wherein the solid shortening is present in an amount of about 15 weight percent to about 35 weight percent; and
   c) a dough specific volume of about 0.8 cc/g to about 1.4 cc/g; wherein the frozen unproofed laminated dough prepares a baked product having a specific volume of at least 3 cc/g when baked without being thawed or proofed before baking, and weight percent is based on weight of the laminated dough.

38. The laminated dough according to claim 37, wherein the solid shortening comprises solid fat, solid fat with water, butter, animal fat, or combinations thereof.

39. The laminated dough according to claim 37, wherein the laminated dough is shelf stable for about 4 months at freezing temperatures, the freezing temperatures being less than about 10° F.

40. The laminated dough according to claim 37, wherein the dough specific volume is about 1.0 cc/g to about 1.2 cc/g.

41. The laminated dough according to claim 37, wherein the laminated dough prepares a baked product having a specific volume of about 3 cc/g to about 6 cc/g.

42. The laminated dough according to claim 37, wherein the laminated dough is substantially free of cysteine.

43. The laminated dough according to claim 37, wherein the flour is substantially free of a modified starch.

44. The laminated dough according to claim 37, wherein the layer dough is capable of withstanding at least one freeze/thaw cycle, wherein the freeze/thaw cycle comprises a temperature fluctuation of the laminated dough between about 32° F. and about 50° F.

45. A baked product prepared from the dough of claim 37.

46. The laminated dough according to claim 37, further comprising a protein supplement.

47. The laminated dough according to claim 46, wherein the protein supplement comprises an egg protein, a dairy protein a wheat protein, or a combination thereof.

48. The laminated dough of claim 47, wherein the protein supplement comprises gluten.

49. The laminated dough according to claim 46, wherein the protein supplement is present in an amount of about 0.4 weight percent to about 2.5 weight percent based on the total weight of the laminated dough.

50. The laminated dough according to claim 49, wherein the protein supplement is present in an amount of about 0.6 weight percent to about 2.3 weight percent based on the total weight of the laminated dough.

51. The laminated dough according to claim 46, wherein the flour comprises a hard wheat winter flour, a hard wheat spring flour, or a combination thereof and a protein amount of about 10.8 weight percent to about 16 weight percent based on the weight of the flour.

52. The laminated dough according to claim 37, wherein the ratio of water-binding agent to water is from about 0.005:1 to about 0.05:1.

53. The laminated dough according to claim 37, wherein the laminated dough is not packaged under a modified atmosphere.

* * * * *